June 21, 1966  F. PETRIN  3,256,804
WAFFLE COOKER

Filed Nov. 12, 1964  2 Sheets-Sheet 1

INVENTOR
FRANK PETRIN
BY
ATTORNEYS

June 21, 1966  F. PETRIN  3,256,804
WAFFLE COOKER

Filed Nov. 12, 1964  2 Sheets-Sheet 2

INVENTOR
FRANK PETRIN

BY
ATTORNEYS

United States Patent Office 3,256,804
Patented June 21, 1966

3,256,804
WAFFLE COOKER
Frank Petrin, 41—10 Judge St., Elmhurst, N.Y.
Filed Nov. 12, 1964, Ser. No. 410,456
6 Claims. (Cl. 99—380)

This invention relates to waffle cookers in general, or waffle "irons" as they are commonly called, and more particularly to a waffle cooker having a novel waffle mold construction which enables it to maintain a more uniform molded cooking surface temperature, which results in waffles of improved quality.

The waffle cooker of the invention is designed to overcome the problem of nonuniform cooking surface temperatures prevalent in prior art waffle cookers. These prior art waffle cookers with their thick mold shells and solid mound members, were usually heated by conduction from an electric heating element disposed adjacent to the posterior surfaces of the mold shells and arranged in a labyrinth. Because these mold shells with solid mound members were actually plates of nonuniform thickness, and were heated in a nonuniform manner, they were subject to relatively large cooking surface temperature variations which resulted in some portions of the waffles being overcooked, or even burned, and other portions being raw.

By providing relatively thin mold shells, of substantially uniform thickness, according to the invention, and heating these shells by means of a fluid medium or vapor, a more uniform cooking surface temperature is achieved, and waffles of improved quality, uniformly cooked can be produced.

The waffle cooker according to the invention is adaptable for operation with either a conventional external heat source, such as a stove, or even an outdoor barbecue grill, or an electric utility source, as in the embodiment which provides a self-contained electric heating element. Thus, the waffle cooker of the invention can be used practically anywhere.

Briefly, the waffle cooker according to the invention comprises a pair of mold shells, each having a posterior surface enclosed by a heating chamber into which a fluid medium, such as steam, hot gas, or even a liquid is passed for heating the mold shells. By providing one of the heating chambers, preferably the lower one, with a heat conductive bottom closure, and means for introducing a liquid therein, and a conduit connecting both heating chambers, the mold shells can be heated by vapors from the liquid which are generated when the bottom closure of the lower chamber is placed in contact with an external heat source.

By adding an electric heating element within the heating chamber where the liquid is introduced, as in one embodiment of the invention, the waffle cooker can be made to operate either electrically or with an external heat source, as desired.

It is, therefore, an object of the invention to provide a waffle cooker having a relatively uniform cooking surface temperature.

Another object of the invention is to provide a waffle cooker as aforesaid wherein the cooking surface temperature can be controllably maintained at a desired level.

Still another and further object of the invention is to provide a waffle cooker as aforesaid which can be selectively heated by electrical energy, or by a conventional external heat source.

Other objects and advantages of the invention will appear in, or become evident from the following detailed description and accompanying drawings wherein.

Figure 1:
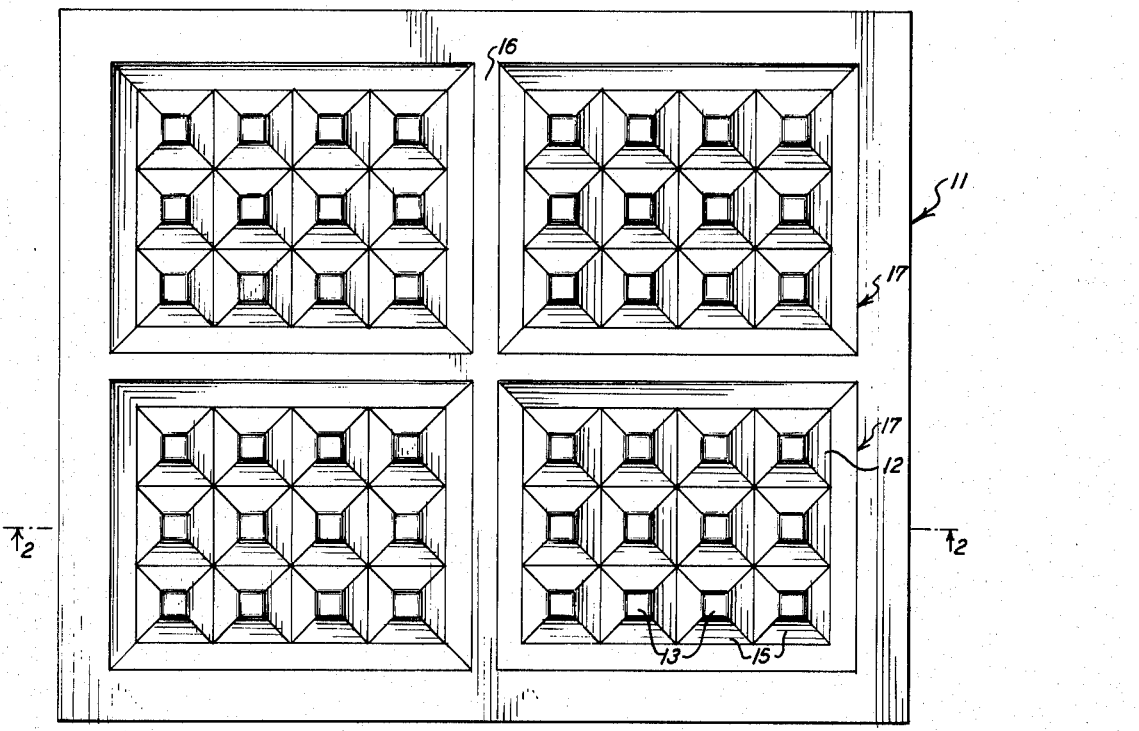
FIG. 1 is a plan view of a typical waffle mold shell according to the invention, looking down at its cooking and waffle molding surface.
Figure 2:
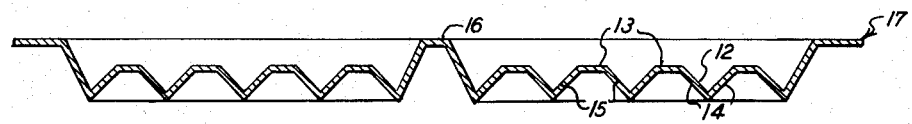
FIG. 2 is a cross-section view of the mold shell of FIG. 1, taken along the line 2—2.

Referring now to FIGS. 1 and 2, illustrating a typical waffle mold shell 11 according to the invention, which is constructed so as to have a molding surface 12, which is also a waffle cooking surface, having a plurality of frustro-pyramidal male mounds 13, and a posterior surface 14. The posterior surface 14 has a corresponding plurality of female indentations 15, each of which is substantially similar in contour to its corresponding male mound 13. Corresponding indentations 15 and mounds 13 are disposed in superposed spaced relation to each other, with the indentations 15 underlying their respective mounds 13, so as to provide a mold shell 11 having a substantially uniform thickness throughout, having hollow mounds 13.

In addition to the mounds 13 which produce waffles (not shown) having the familiar indentation grid pattern, a plurality of male barriers 16, constructed similarly to the mounds 13, so as to be hollow and maintain a uniform mold shell 11 thickness, divide the shell 11 into a plurality of waffle compartments 17, four of such compartments 17 being shown in FIG. 1 for illustrative purposes only. As desired, the number of compartments 17 and mounds 13 per compartment, the arrangement of mounds 13 in each compartment, as well as the shape of said mounds 13, can be varied.

The mold shell 11 is preferably made of metal, or any other suitable heat conductive material, and as desired, can be either cast, or formed from sheet metal.

Figure 3:
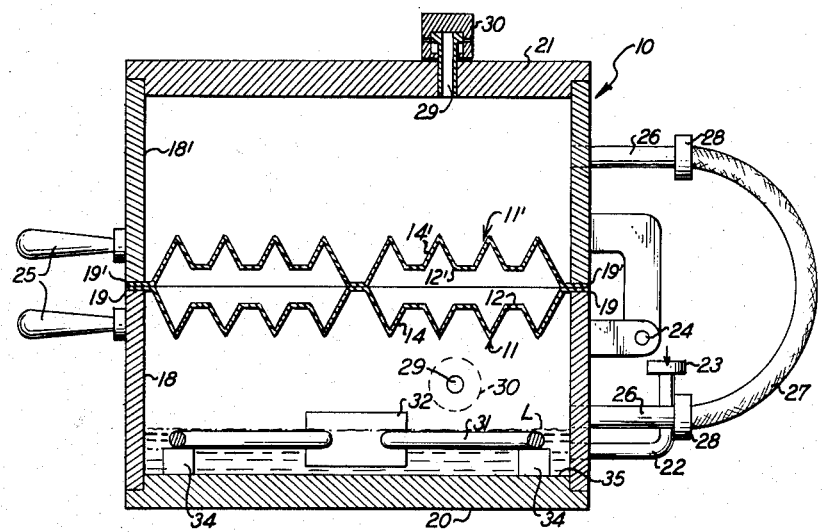
FIG. 3 is an assembly of a preferred embodiment of a waffle cooker according to the invention, partly in section, and which has a pair of mold shells of the type shown in FIGS. 1 and 2.

FIG. 3 shows an assembled waffle cooker 10 according to the invention which has a pair of mold shells 11 and 11', in the position where the lower and upper shells 11 and 11' respectively are in matched abutting contact with their respective molding surfaces 12 and 12' facing each other to form a closed mold, as when cooking waffles. Heating chambers 18 and 18' enclose the posterior surfaces 14 and 14' of the mold shells 11 and 11', said shells 11 and 11' being fastened and sealed to their respective chambers 18 and 18' along their boundary edges 19 and 19'. This sealing and fastening of the shell edges 19 and 19' to the chambers 18 and 18' can be accomplished by any conventional means (not shown) such as welding, bolting etc. However, it is essential that they be sealed so as to withstand the temperatures and pressures of fluids or vapors introduced into said chambers 18 and 18', as will be described hereinafter.

The lower chamber 18 is provided with a bottom closure 20 which can be either fastened thereto as in the case of the shells 11 and 11', or constructed integrally therewith. Similarly the upper chamber 18' is provided with a top closure 21 which also can be either fastened thereto or constructed integrally therewith. Regardless of the fastening means used for securing the closures 20 and 21 to the chambers 18 and 18', they must be capable of withstanding the internal pressures therein.

A tube 22, extending from the lower chamber 18 is provided for introducing a liquid to be vaporized within said chamber 18. The tube 22 is provided with a pressure-tight cap 23.

For convenience in operation, the chambers 18 and 18' are pivotally connected at 24, and are provided with handles 25, which are preferably insulated. Thus, the shells 11 and 11' can be swung open to place waffle batter (not shown) in the lower shell 11', and closed to cook said batter into molded waffles in the conventional manner.

The lower and upper chambers 18 and 18' are flow connected by means of the pipe sections 26 which extend outward therefrom and the flexible line 27 joined thereto by fittings 28.

In the operation of the waffle cooker 10, a quantity of liquid L is introduced into the lower chamber 18 through the tube 22, and the cap 23 is closed tight. The bottom closure 20 is heated externally by any suitable means (not shown) to vaporize the liquid L, thereby causing it to contact the posterior surface 14 of the shell 11 and flow through the pipes 26 and line 27 into the upper chamber 18' where it contacts the surface 14' of the shell 11', thereby raising the temperature of the molding surfaces 12 and 12' to a suitable level for cooking waffles.

To prevent rupture of the waffle cooker 10, and to control the pressure and hence the temperature of the vapor within the chambers 18 and 18', so as to maintain the cooking surfaces 12 and 12' at a desired temperature level, the top closure 21 is provided with a vapor exit passage 29 defined by and extending through a relief valve 30.

Where the waffle cooker 10 is operated so that a quantity of liquid L always remains in contact with the vapor in the chambers 18 and 18', said vapor will be saturated rather than superheated, and accordingly will have a unique temperature established by its pressure. Thus, by providing an appropriate valve 30 pressure setting, the vapor temperature, and hence the temperature of the cooking surface 12 and 12' can be maintained at a desired level.

Alternatively the waffle cooker 10 may be operated with the line 27 removed and the pipes 26 connected to an external heating fluid source (not shown), such as steam lines, hot liquid lines, etc. For operation as aforesaid, the chambers 18 and 18' must be provided with fluid return or discharge passages (not shown) for proper circulation of heating fluid therein. In the case where the pipes 26 are each supplied with steam, or another hot gas or vapor, the lower chamber 18 can be provided with an exit pasasge 29 through a pressure relief valve 30 as in the upper chamber 18', so as to maintain a steady flow at constant pressure.

Also, where an external steam or hot gas source is available, the waffle cooker 10 can be operated without the liquid L by connecting the tube 22 to a line (not shown) from such a source, without any further modifications. In the aforesaid cases where a heating fluid is supplied to the chambers 18 and 18', it is not necessary to heat the bottom closure 20, and said closure 20 can be externally insulated, or made of an insulating material.

The waffle cooker 10 can also be adapted to operate electrically by providing an electric heating element 31 inside of the lower chamber 18.

Figure 4:
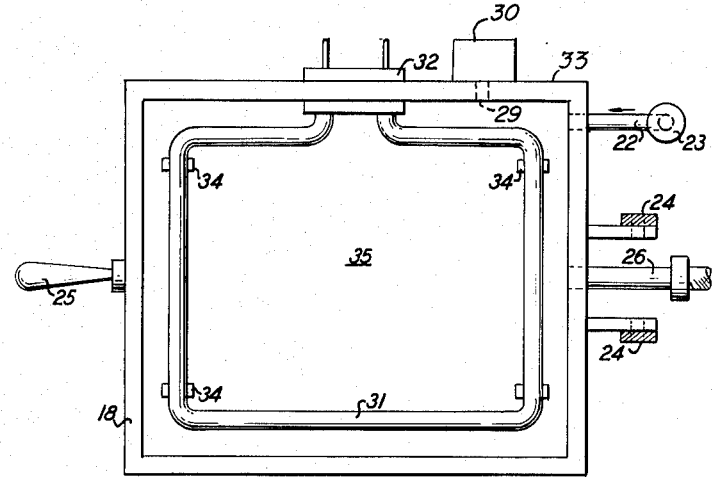
FIG. 4 is a plan view of the lower heating chamber of FIG. 3 with its mold shell removed, showing a typical electric heating element arrangement.

As shown in FIGS. 3 and 4, the heating element 31 is connected to the terminals of a jack plug 32 which passes through the wall 33 of the chamber 18 and is in pressure-tight sealing engagement therewith. For example, the heating element can be in the form of a single loop as shown by FIG. 4 and should be supported inside of the chamber 18 so as to be in contact with the liquid L as in FIG. 3. This support can be provided by a plurality of spacers 34 which hold the heating element 31 in close proximity to the interior surface 35 of the closure 20, so that it will be wetted by the liquid L, and thus be effective to vaporize substantially all of said liquid L.

The waffle cooker 10 may be adapted to operate either electrically by means of the heating element 31, or with other external heat sources (not shown), selectively, by making the bottom closure 20 of the heat conductive material, such as metal, so as to provide a cooker 10 having a dual heating mode capability.

Should it be desired to operate the cooker 10 by means of the heating element 31, the closure 20 can be made of insulating material, so as to permit it to be placed upon surfaces, such as tables, which might be damaged if the closure 20 were made of a good heat conducting material without any exterior insulation.

As can be realized by the foregoing detailed description, the waffle cooker 10, with its novel mold shell 11 and 11' construction and use of a fluid which is heated by means out of proximity or contact with said mold shells, provides a more uniform waffle cooking temperature distribution than in prior art waffle cookers, as well as other advantages.

What is claimed is:

1. A waffle cooker which comprises:
    (a) a first mold shell having a molding surface and a posterior surface, said molding surface having a plurality of integral male mounds, said posterior surface having a corresponding plurality of female indentations, each of said indentations being substantially similar in contour to its corresponding male mound, and disposed in superposed spaced relation thereunder so as to form a mold shell of substantially uniform thickness with hollow male mounds;
    (b) a first heating chamber enclosing the posterior surface of said first mold shell;
    (c) a second mold shell similar to the first;
    (d) a second heating chamber enclosing the posterior surface of said second mold shell;
    (e) means for passing a heating fluid through each of said first and second heating chambers whereby when said mold shells are placed in abutting contact with their molding surfaces facing each other to form a closed mold, and a quantity of waffle batter is placed within said mold, the heating fluid contacts the posterior surfaces of the mold shells thereby raising the temperature of their molding surfaces to cook molded waffles.

2. A waffle cooker which comprises:
    (a) a lower mold shell having a molding surface and a posterior surface, said molding surface having a plurality of integral male mounds, said posterior surface having a corresponding plurality of female indentations, each of said indentations being substantially similar in contour to its corresponding male mound, and disposed in superposed spaced relation thereunder so as to form a mold shell of substantially uniform thickness with hollow male mounds;
    (b) a lower heating chamber enclosing the posterior surface of said lower mold shell, said heating chamber having a heat conductive bottom closure;
    (c) an upper mold shell similar to said lower mold shell;
    (d) an upper heating chamber enclosing the posterior surface of said upper mold shell, said chamber having a vapor exit passage;
    (e) means for introducing a liquid into said lower heating chamber;
    (f) a conduit connecting said upper and lower heating chambers whereby when said mold shells are placed in abutting contact with their molding surfaces facing each other to form a closed mold, and a quantity of waffle batter is placed within said mold, and the bottom closure of the lower heating chamber is heated to vaporize the liquid introduced therein, the vapor therefrom contacts the posterior surface of the lower mold shell and flows through said conduit into the upper heating chamber where it contacts the posterior surface of the upper mold shell thereby causing the molding surfaces of said shells to be heated to cook molded waffles.

3. The waffle cooker of claim 1 wherein the heating chambers are pivotally connected.

4. The waffle cooker of claim 2 wherein the heating chambers are pivotally connected and the conduit is flexible.

5. The waffle cooker of claim 2 including a pressure relief means defining said vapor exit passage of the upper heating chamber, said pressure relief means being disposed to maintain the vapor pressure within both the upper and lower heating chambers, and hence the temperatures of the molding surfaces at a predetermined level.

6. The waffle cooker of claim 5 including an electrical heating element disposed within the lower heating chamber to permit the liquid introduced therein to be heated and vaporized electrically as well as by heat conducted through the bottom closure of said lower heating chamber.

References Cited by the Examiner

UNITED STATES PATENTS

| | | | |
|---|---|---|---|
| 397,709 | 2/1889 | Filer | 126—20 |
| 1,086,940 | 2/1914 | Ryon. | |
| 2,380,121 | 7/1945 | Robertson | 126—20 |
| 2,610,572 | 9/1952 | Farr | 99—376 X |
| 2,674,935 | 4/1954 | Lewis et al. | 99—234 |
| 2,980,099 | 4/1961 | Klemm | 99—234 |
| 3,191,518 | 6/1965 | Pavelka | 99—234 |

WALTER A. SCHEEL, *Primary Examiner.*

BILLY J. WILHITE, *Examiner.*